J. C. REED.
Stove Polish Mixer and Scraper.
No. 23,784.  Patented April 26, 1859.
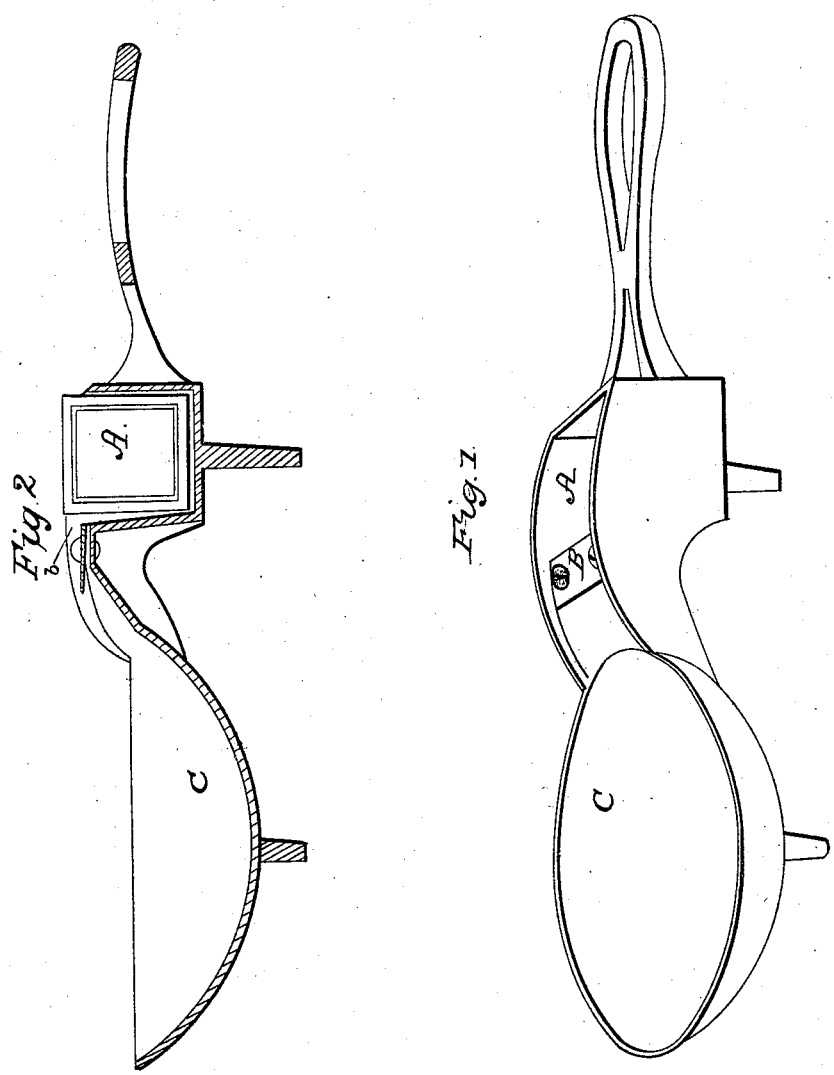

UNITED STATES PATENT OFFICE.

JOHN C. REED, OF PROVIDENCE, RHODE ISLAND.

STOVE-POLISH MIXER AND SCRAPER.

Specification of Letters Patent No. 23,784, dated April 26, 1859.

*To all whom it may concern:*

Be it known that I, JOHN C. REED, of Providence, in the county of Providence and State of Rhode Island, have invented a new and Improved Stove - Polish Mixer and Scraper; and I do hereby declare that the following is a full and exact description of the same, reference being had to the accompanying drawings, making part of this specification, and to the letters of reference marked thereon.

*Drawings.*—Drawing I, is a view in perspective of my improved stove-polish mixer and scraper in which A shows the receptacle for the polish, B the scraper, C, the bowl for mixing the polish. Drawing II, is a sectional drawing of the same, A showing the receptacle for the polish, B the scraper, C the bowl for mixing the polish.

To enable others skilled in the art to make and use my invention I will proceed to describe its construction and operation.

*Construction.*—My improved stove-polish mixer and scraper is formed of cast-iron and consists of the following parts. A, a receptacle for containing the polish. B, a scraper or knife formed of steel, for scraping the polish from a block of the same. C, a bowl or mixer, for mixing the same after it has been so scraped.

*Operation.*—The polish is rubbed over the knife or scraper (B) and drops into the basin or bowl (C) when it is mixed.

I do not claim any of the parts of the article when used separately, but

I do claim and desire to secure by Letters Patent—

The combination of the receptacle A, scraper B, and mixer (C) when aranged and operated as described.

JOHN C. REED.

Witnesses:
BENJAMIN G. LUTHER,
THOS. W. RYDER.